(12) United States Patent
Carbune et al.

(10) Patent No.: US 11,494,631 B2
(45) Date of Patent: Nov. 8, 2022

(54) SMART ADVANCED CONTENT RETRIEVAL

(71) Applicant: Google Inc., Mountain View, CA (US)

(72) Inventors: Victor Carbune, Basel (CH); Sandro Feuz, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 811 days.

(21) Appl. No.: 15/716,848

(22) Filed: Sep. 27, 2017

(65) Prior Publication Data

US 2019/0095786 A1 Mar. 28, 2019

(51) Int. Cl.
*G06N 3/08* (2006.01)
*G06N 7/00* (2006.01)
(Continued)

(52) U.S. Cl.
CPC ............... *G06N 3/08* (2013.01); *G06N 7/005* (2013.01); *G06Q 30/0202* (2013.01);
(Continued)

(58) Field of Classification Search
CPC . H04L 67/32; H04L 67/2847; H04L 67/5681; H04L 67/289; H04L 67/60; G06Q 30/0202; G06N 3/0445; G06N 3/08
See application file for complete search history.

(56) References Cited

U.S. PATENT DOCUMENTS 5,978,841 A 11/1999 Berger
6,256,633 B1 7/2001 Dharap
(Continued)

FOREIGN PATENT DOCUMENTS

CN 103823805 5/2014
CN 104704522 6/2015
(Continued)

OTHER PUBLICATIONS

PCT International Search Report and Written Opinion issued in International Application No. PCT/US2018/032094, dated Aug. 17, 2018, 16 pages.
(Continued)

*Primary Examiner* — Miranda M Huang
*Assistant Examiner* — Yao David Huang
(74) *Attorney, Agent, or Firm* — Middleton Reutlinger (57) ABSTRACT

Methods, systems, and apparatuses for implementing advanced content retrieval are described. Machine learning methods may be implemented so that a system may predict when a user device may experience network disconnections. The system may also predict the type of content one or more applications on the user device may seek to download during the network disconnection period. Neural networks may be trained based on user activity log data and may implement machine-learning techniques to determine user preferences and settings for advanced content retrieval. The system may predict when a user may want to download content in advance, the type of content the user may be interested in, anticipated network connectivity, and anticipated battery consumption. The system may then generate recommendations for the user device based on the predictions. If a user agrees with the recommendations, the system may obtain and cache the content.

17 Claims, 4 Drawing Sheets

(51) Int. Cl.
*G06Q 30/02* (2012.01)
*H04L 67/289* (2022.01)
*H04L 67/50* (2022.01)
*H04L 67/5681* (2022.01)
*G06N 3/04* (2006.01)
*H04L 67/60* (2022.01)

(52) U.S. Cl.
CPC .......... *H04L 67/289* (2013.01); *H04L 67/535* (2022.05); *H04L 67/5681* (2022.05); *G06N 3/0445* (2013.01); *H04L 67/60* (2022.05)

(56) References Cited

U.S. PATENT DOCUMENTS

| | | | |
|---|---|---|---|
| 8,495,083 B2 | 7/2013 | Liebling | |
| 9,009,292 B2* | 4/2015 | Ho | H04L 67/306 709/224 |
| 9,129,264 B2* | 9/2015 | Lyle | G06Q 10/1093 |
| 9,247,463 B1 | 1/2016 | Guo et al. | |
| 9,414,222 B1 | 8/2016 | Dixon | |
| 9,948,742 B1* | 4/2018 | Bueche | G06F 16/435 |
| 10,311,372 B1* | 6/2019 | Hotchkies | H04L 67/2885 |
| 2009/0006308 A1 | 1/2009 | Fonsen | |
| 2012/0276845 A1* | 11/2012 | Wikander | G06Q 20/32 455/41.1 |
| 2013/0344896 A1* | 12/2013 | Kirmse | G06F 16/9574 455/456.3 |
| 2014/0095943 A1* | 4/2014 | Kohlenberg | G06F 11/004 714/47.3 |
| 2014/0310701 A1* | 10/2014 | Chylinski | G06F 8/65 717/173 |
| 2015/0154016 A1 | 6/2015 | Liang et al. | |
| 2015/0193347 A1* | 7/2015 | Kluesing | G06F 12/0888 711/137 |
| 2015/0351037 A1* | 12/2015 | Brown | G06N 20/00 455/574 |
| 2016/0234290 A1* | 8/2016 | Sharma | H04W 4/029 |
| 2017/0004404 A1* | 1/2017 | Fujimura | G06N 20/00 |
| 2017/0039038 A1* | 2/2017 | Huber | G06F 11/3072 |
| 2017/0315917 A1* | 11/2017 | Yamamoto | H04L 67/14 |
| 2017/0347236 A1* | 11/2017 | Frusina | H04N 21/2365 |
| 2018/0189226 A1* | 7/2018 | Hofverberg | H04N 21/23106 |
| 2018/0270831 A1* | 9/2018 | Meredith | H04W 4/027 |
| 2018/0302630 A1* | 10/2018 | Copley | H04L 67/22 |

FOREIGN PATENT DOCUMENTS

| | | |
|---|---|---|
| CN | 104903929 | 9/2015 |
| CN | 105335391 | 2/2016 |
| WO | WO 2014/004264 | 1/2014 |
| WO | WO 2014/194441 | 12/2014 |

OTHER PUBLICATIONS

European Patent Office; Communication under Rule 71(3) EPC issued in Application No. 18733967.6; 50 pages; dated Jul. 9, 2021.
China National Intellectual Property Administration; Office Action issued for Application No. 201880062783.2, 35 pages, dated Jan. 28, 2022.
Sauble, Daniel; Offline: When Your Apps Can't Connect to the Internet; Baidu; retrieved from internet httpp://www.ui.cn/detail/46563.html; 22 pages; dated Apr. 16, 2015.
Zhong, Yan; Research and Design of After-Sales Service Management System for Roadheader Supporting Off-line Application; Master Degree Thesis for Southwest Jiaotong University; 59 pages; dated Jan. 15, 2016.
China National Intellectual Property Administration; Notification of Grant issued in Application No. CN201880062783.2; 6 pages; dated Jul. 6, 2022.

* cited by examiner

SMART ADVANCED CONTENT RETRIEVAL

FIELD

This disclosure generally relates to data communication.

BACKGROUND

Users increasingly rely on portable electronic devices to access information or obtain data on demand. However, users may experience difficulties accessing information when their devices lack wireless network connection and they forget to download the information in advance of the network disconnection period.

SUMMARY

This disclosure generally describes systems and methods in which a user device is trained to retrieve data before a time period at which no network connectivity is expected.

According to implementations, methods and systems for advanced retrieval of content to be output at a future time are described. Machine learning methods may be implemented so that a system with neural networks may be trained to predict when a user device may experience network disconnections. The system may also predict the type of content one or more applications on the user device may seek to download during periods with little or no network connection. The system may then generate recommendations for the user device based on the predictions. If a user agrees with the recommendations, the system may obtain and cache the content. The stored content may be output when the user device has little or no network connectivity or at any other time in future.

The advanced content retrieval methods and systems described in this specification offer a number of advantages. For example, a user device may schedule content acquisition ahead of a time when the user device is not expected to have a network connection. The content may be obtained with minimal or no user input. By utilizing user-specific training data, the system may generate predictions and recommendations that are more accurate and consistent with a practical use of the user device resulting in optimized and more efficient battery usage in a user device. Furthermore, by learning user preferences and not requiring user inputs, the user is liberated from the burden of requesting data download in advance or anticipating times periods when the user's device will be disconnected from the network. A user can direct the user's attention elsewhere and engage in any other activity while the user device executes one or more operations in the background to make predictions and obtain content.

In addition, the described methods and systems enhance utility of the applications by providing applications with data even when no network connection is available. Accordingly, applications may be able to operate with or without network connection. The advanced content retrieval methods may be implemented with various applications and may interact with the applications using application programming interfaces to obtain content specific to each application.

Innovative aspects of the subject matter described in this specification include, in some implementations, a computer-implemented method to perform operations. The operations include training a neural network system using activity log data. One or more computing devices determine one or more parameters to configure an acquisition of data at a first future time based on the training of the neural network system using the activity log data, generate a recommendation to acquire the data at the first future time based on the one or more parameters and the training of the neural network system using the activity log data, and receive a user input indicative of an acceptance or rejection of the generated recommendation to acquire the data at the first future time. In response to receiving the user input indicative of an acceptance of the generated recommendation, the one or more computing devices obtain the data at the first future time from one or more content delivery servers, train the neural network system using the received user input, determine a second future time to output the obtained data using the trained neural network system, and control a display to output the obtained data at the second future time.

Implementations may each optionally include one or more of the following features. For instance, in some implementations, the one or more parameters include a content type, a content size, a location, a financial threshold to purchase the data, and a wireless connectivity threshold. The activity log data includes activity data indicative of user behavior.

In some implementations, the determining of the one or more parameters to configure the acquisition of data at the first future time based on the training of the neural network system using the activity log data operation includes operations of determining that a trigger condition is satisfied, determining a time associated with the trigger condition, determining a content type frequently obtained by a user at the time associated with the first future time, and determining that the first future time is associated with the time associated with the trigger condition.

In some implementations, the determining the one or more parameters to configure the acquisition of data at the first future time based on the training of the neural network system using the activity log data operation further includes determining one or more of: a size of the content type; a likely financial cost of obtaining the data at the first future time; and an availability of funds to pay for the likely financial cost.

In some implementations, the generation of the recommendation to acquire the data at the first future time based on the one or more parameters and the training of the neural network system using the activity log data operation includes determining a likely level of wireless connectivity of a user device at the first future time; determining a probability that an entirety of the data is downloadable at the determined likely level of wireless connectivity during a threshold time period beginning with the first future time, the threshold time period being (i) a time period during which the user device is likely to remain connected to a wireless network at or above a particular wireless connectivity threshold level, or (ii) a time period selected by a second user input; and determining that the probability exceeds a confidence threshold.

In some implementations, the operations further include the one or more computing devices controlling an output device to output the recommendation. The output device includes one or more of the display or a speaker. When the output device is the display, the user input is received using a graphical user interface displayed by the display.

In some implementations, the second future time is a time at which a user device including the display and the one or more computing devices is likely not connected to a wireless network.

In some implementations, the determining of the one or more parameters to configure the acquisition of data at the first future time based on the training of the neural network system using the activity log data operation includes: determining one or more applications that are configured to obtain application data at a particular time before outputting the application data using the one or more applications; and determining a content type of the application data, a content size of the application data, a likely financial cost of obtaining the application data at the first future time, and an availability of funds to pay for the likely financial cost.

Other implementations of these aspects include corresponding systems, apparatus, computer-readable storage media, and computer programs configured to implement the actions of the above-noted methods.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designation in the various drawings indicate like elements.

DETAILED DESCRIPTION

Figure 1A:
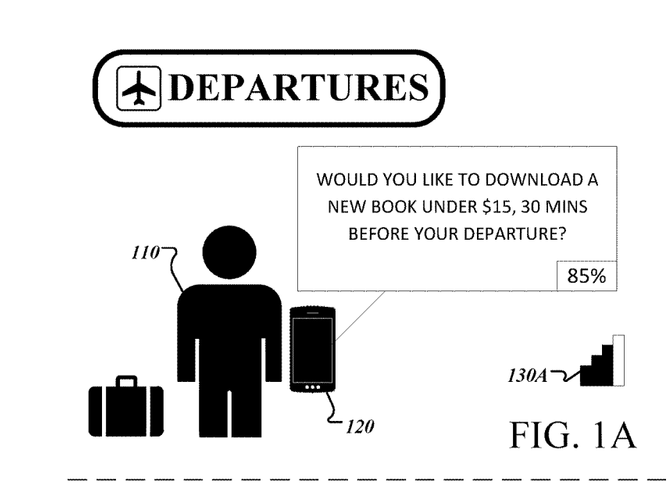
FIGS. 1A-1D depict exemplary scenarios of advanced content retrieval.

FIGS. 1A-1D depict exemplary scenarios of advanced content retrieval and are generally related to a user 110 with a user device 120 preparing to board a flight at a Departure lounge. Referring to FIG. 1A, the user device 120 may be connected to a wireless network, such as an airport's WiFi network. The wireless connection may have a signal strength 130A.

The user device 120 may provide an Advance Information Retrieval (AIR) interface through which the user device 120 communicates with the user 110 to obtain user instructions or push notifications to the user. The AIR interface may be connected to an applications (app) manager and a recommendation engine, and may output one or more recommendations for retrieving content for one or more apps. For example, an electronic book reading (e-book) application may be registered with the app manager and may request the app manager to provide content at periods of time when the user is likely not to have Internet connection. The app manager may also provide instructions to the recommendation engine to generate recommendations for retrieving content for the e-book app prior to the time that the user is likely not to have an Internet connection.

For example, in FIG. 1A, the recommendation engine may determine that user 110 will be boarding a flight in 30 minutes and will thereafter likely not have connection to the Internet. The recommendation engine may then generate recommendations for one or more apps, such as the e-book app, that have registered with the app manager. In the exemplary implementation illustrated in FIG. 1A, the user device 120 may display a query message "WOULD YOU LIKE TO DOWNLOAD A NEW BOOK UNDER $15, 30 MINS BEFORE YOUR DEPARTURE?" The methods of generating recommendations are described in detail below with reference to FIGS. 2 and 3.

Figure 1B:
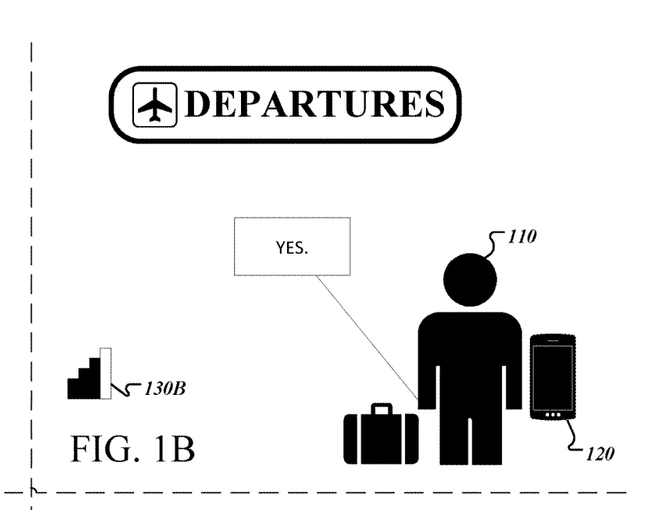
Figure 1C:
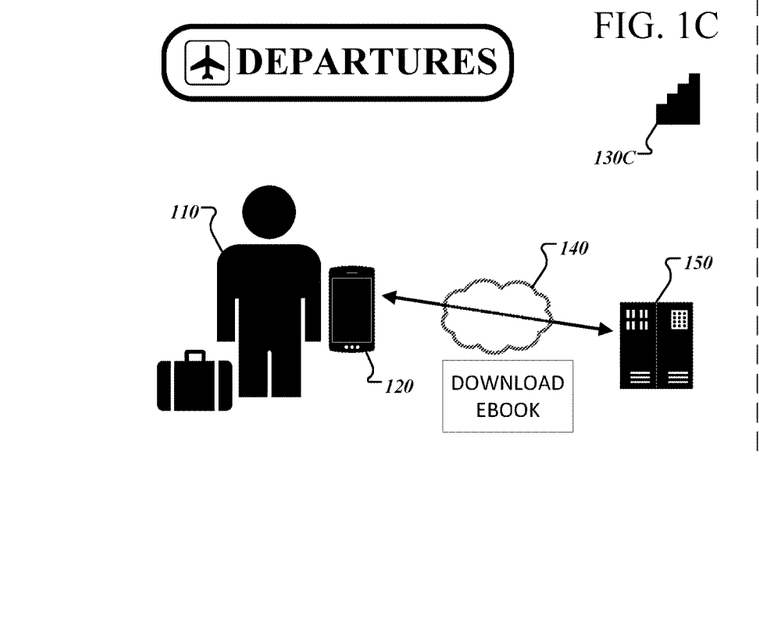

In response to the query message, the user 110 may provide an input to answer the query message. For example, as shown in FIG. 1B, the user 110 may respond with an affirmative response to indicate that the user device 120 should be downloading an electronic book 30 minutes before departure. The user device 120 may then download the electronic book from any suitable source such as a server, database, or network storage device 150 and using any suitable wireless network 140, such as a Cloud system, as shown in FIG. 1C. If the user device 120 is configured to download content only when the network connectivity is at or above a particular threshold, such as a maximum network connectivity, the user device 120 may delay the download until network connectivity 130C of the user device 120 satisfies the particular threshold.

Figure 1D:
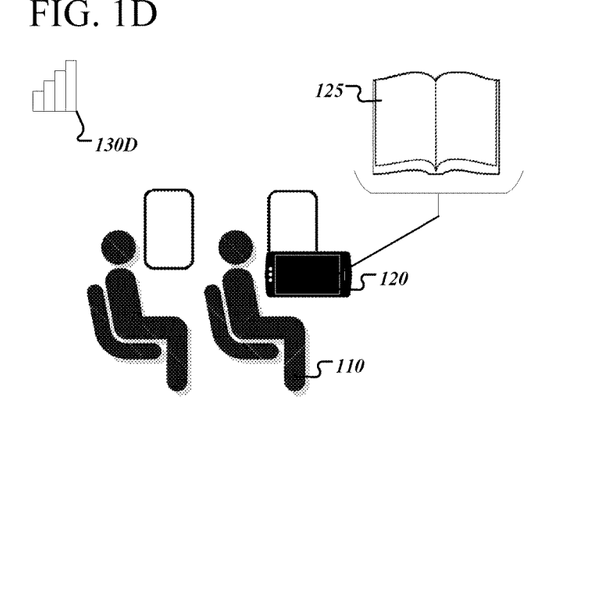

As shown in FIG. 1D, when the user 110 is seated in the airplane and has no wireless network connectivity 130D, the user 110 may wish to read the downloaded e-book 125 through user device 120. The user 110 may then execute the e-book app and begin reading the e-book 125 while seated in the airplane and without having any wireless network connectivity.

Figure 2:
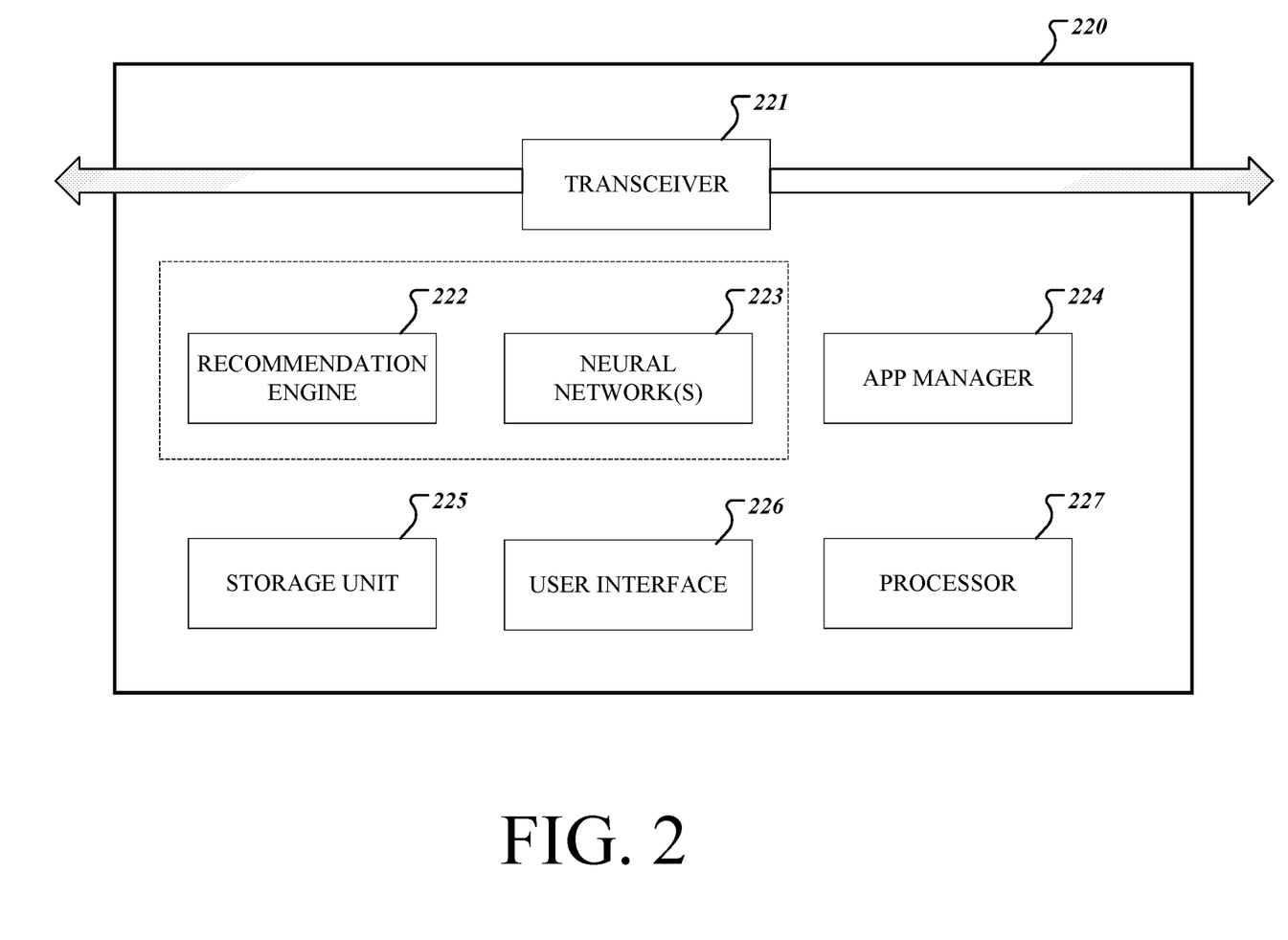
FIG. 2 depicts an exemplary user device that provisions advanced content retrieval.

FIG. 2 depicts an exemplary implementation of a user device 220 that can be used for advanced content retrieval. The user device 220 may include a transceiver 221, a recommendation engine 222, an app manager 224, a storage unit 225, a user interface 226, a processor 227, and one or more neural networks 223.

The transceiver 221 includes a transmitter and a receiver and may be utilized to communicate with other network devices, which may include any device that is connected to the user device 220 through a wireless or wired network. The transceiver 221 may include amplifiers, modulators, demodulators, antennas, and various other components. The transceiver 221 may direct data received from other devices such as network devices to other components of the user device 220 such as the processor 227 and storage unit 225. The transceiver 221 may also direct data received from components of the user device 220 to other network devices.

The user interface 226 may include one or more of a display unit, speaker, input unit, and one or more sensors. The sensors may include an optical sensor, capacitive sensor, charge-coupled device sensor, gyroscope, microphone, altimeter, impact sensor, piezoelectric sensor, motion sensor, biosensor, active pixel sensor, and various other sensors that may detect one or more conditions. The input unit may include various devices that are configured to receive one or more inputs. For example, the input unit may include a mouse, a touch pad, the one or more sensors, or a keyboard for receiving alphanumeric text.

The display unit in the user interface 226 may display various data, such as data provided through the AIR interface. The display unit may be implemented through any suitable display including, for example, a projection display, a liquid crystal display (LCD), or light emitting diode (LED) display. In some implementations, the display unit, input unit, and one or more sensors may be combined into a single integrated component such as a capacitive touch screen or resistive touch screen. In some implementations, the display unit, input unit, and one or more sensors may be multiple components.

The processor 227 may be coupled to all components of the user device 220, and may control the operations of the user device 220. The processor 227 may include various logic circuitry and programs to execute the various implementations described herein. In some implementations, the processor may include multiple processors, each executing one or more functions and operations.

Storage unit 225 may include one or more mass storage devices, e.g., magnetic, magneto optical disks, optical disks, EPROM, EEPROM, flash memory devices, and may be implemented as internal hard disks, removable disks, magneto optical disks, CD ROM, or DVD-ROM disks for storing data. The storage unit 225 may store one or more user activity logs, rules for training neural networks, and rules for generating recommendations.

The app manager 224 may manage the exchange of data with one or more apps in the user device 220. In some implementations, when an app is newly downloaded onto the user device 220 or the user device 220 is powered for the first time, the app manager 224 may detect the newly installed app or all the apps in the user device 220 and transmit a message to the detected app(s) indicating that a service providing advanced retrieval of content is available.

If an app is interested in this service, the app may respond to the broadcast message by transmitting a request to the app manager 224 to register the app for the advanced content retrieval service. The request to register the app may include data indicating a type of content the app is interested in obtaining in advance, any size, frequency, and timing limitations for the content to be obtained in advance, and, in general, any other parameters or limitations for the type of content the app is interested in obtaining in advance.

After receiving the request to register, the app manager 224 may register the app, store data indicative of the app-specified limitations for the content to be obtained in advance, and provide an application programming interface (API) to the registered app. Subsequent data exchanged between the app and the app manager 224 may be channeled through the API. In some implementations, the app manager 224 may transmit an acknowledgement message to the app or a server managing the app indicating that the app has been registered with the app manager 224 for an advanced content retrieval service.

In some implementations, after receiving the registration request from an app that includes parameters or limitations for the type of content the app is interested in obtaining in advance, the app manager 224 may cause the user device 220 to display a message asking the user to confirm the parameters or limitations specified by the app for advanced content retrieval. The user may then confirm, remove, or add one or more parameters or limitations specified by the app. The app manager 224 may then save settings that include the parameters or limitations for the app that have been confirmed or selected by the user.

For example, a social network app may request the app manager 224 to provide location predictions and advanced content retrieval based on the predicted location, e.g., if a user is predicted to be at a particular location with poor network connectivity, the social network app may request providing menus for restaurants in the particular location in advance. However, a user may confirm or deny the request to provide location predictions and advanced content retrieval for the social network app.

In some implementations, the app manager 224 may not broadcast a message to the detected apps upon user device 220 startup or upon installation of an app. In these implementations, the app manager 224 may remain in a listening mode, receive registration requests from one or more apps, and provide an advanced content retrieval API upon registering apps that the app manager 224 receives requests from.

Neural networks 223 may collect data from various signals, use the collected data to train the neural networks 223, and generate predictions. Sources of the signals used to train the neural networks 223 may be external or internal to the user device 220. For example, the neural networks 223 may receive data from one or more databases or servers that store user activity logs and that store rules for training the neural networks 223. The neural networks 223 may also receive training data from an external server or data indicative of phone usage patterns such as phone call data and chat data for a phone service provider.

In some cases, the neural networks 223 may receive data from transceiver 221 indicating a network connectivity status and sensors included in the user device 220 such as location sensors, motion sensors, temperature and environmental sensors, audio sensors, light sensors, capacitive sensors, and resistive sensors. For instance, the neural networks 223 may receive information about network connectivity in certain locations, under certain environmental conditions, at particular times of the day, or under certain lighting and audio conditions.

The neural networks 223 may also receive data directly from apps on the user device 220 such as a calendar app, travel apps, banking apps, indicative of operations executed by the apps, user preferences and selections made through the apps, a frequency of use of apps, and frequency of functions executed by the used apps. The user activity log may also collect data indicative of a movement of the user or user device 220, locations that the user device 220 or user may have been present in, user travel plans, shopping transactions, banking transactions, and social media interactions.

The user may be provided with controls allowing the user to elect if and when the user device 220, systems, programs or features described herein may collect data for the user activity log or training of the neural network, and if the user is interested in receiving recommendations from the user device 220. Any user data collected may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of the user cannot be determined. Thus, the user may have control over what information is collected, how that information is used, and what information is provided to the user.

In some implementations, the neural networks 223 may receive data or rules for configuring a training model for the neural networks 223. For example, the neural networks 223 may receive configuration data to execute machine-learning operations according to any suitable neural network model, including but not limited to, a Recurrent Neural Network (RNN), Gated Recurrent Unit (GRU), Long Short-Term Memory (LSTM), or a large Feed Forward Neural Network.

Data collected by the neural networks 223 may be collected in any suitable format and may be time stamped and tagged with source identifiers to indicate which apps, sensors, or other source provided training data and the time and date the data was provided. Based on the collected data and the training model, the neural networks 223 may generate one or more predictions.

In some implementations, the neural networks 223 may predict periods of internet disconnection, intermittent connectivity, or other states of network connectivity. In some implementations, the neural networks 223 may predict locations and times at which a network connectivity of the user device 220 will be less than a network connectivity threshold and predict the content type most likely consumed by the user at the predicted times and locations.

For example, in some implementations, the neural network 223 may identify disconnected time periods in the past when the user device 220 had network connectivity below a particular signal threshold level. The neural network 223 may then determine corresponding conditions associated with the disconnected time periods. These corresponding conditions may include a location of the user device 220 immediately before, during, and immediately after the disconnected time periods, an activity that the user was likely engaged in immediately before, during, and immediately after the disconnected time periods, an app or operation that is executed immediately before, during, and immediately after the disconnected time periods, and data that is accessed immediately before, during, and immediately after the disconnected time periods. The length of the time period immediately before or after the disconnected time periods may be set by a user or configured by a systems designer.

As an example, the neural network 223 may predict that a user will likely watch a video on a flight during the upcoming Monday and Thursday because the user watches movies when the user travels by air every Monday and Thursday and lacks Internet connectivity while on the aircraft. In another example, the neural networks 223 may predict that the user will likely read an electronic book on the third Saturday of the current month while on a camping trip because the user typically travels to a camp site that lacks network connectivity on the third Saturday of six or more months of the year.

As another example, if the user device 220 is connected to a WiFi network of an airport, the user device 220 may determine that the user device 220 is likely to have the same signal strength for the time duration before the scheduled flight departure time. If the user device 120 is connected to a cellular network, the user device 220 may determine that the user device 220 is unlikely to have required signal strength for the time duration before the scheduled flight departure time.

In some implementations, the neural networks 223 may also predict a degree of phone usage by the user, along with type of usage to infer battery consumption. For example, using user activity log data that indicates similar user activities in the past, the neural networks 223 may predict that the user is likely to go for a run on weekday evenings and use GPS tracking for 20 minutes, or that the user is scheduled to go on a boat trip with friends where the user is likely not going to have good network connectivity, and will likely take photos or videos. The neural networks 223 may then infer the amount of battery consumption likely to occur at a particular time by determining the battery consumption for the same activities in the past, and whether the likely battery status and network connectivity will be sufficient to support the downloading of data at particular times.

The neural networks 223 may be trained to detect time periods and locations in which battery consumption may impact the user device 220's ability to download content. For example, the neural network 223 may determine the likely amount of time and power required for the user device 220 to download data of a particular size, e.g., 100 MB, at the likely level of network connectivity when the data is to be downloaded. The neural network 223 may then compare the determined amount of time and power and compare it with the current battery level or anticipated battery level at the time the data is to be downloaded, and determine if the user device 220 has sufficient battery power or not.

In some implementations, the neural networks 223 may predict user preferences such as cost preferences, type of data to be downloaded, network connection thresholds, battery thresholds, and in general any user setting. The user preferences may be derived by the neural networks 223 using training data from different data sources, including, for example, user activity log data. For example, if a user frequently downloads e-books, pays less than $15 for each book, and has refused to purchase e-books that cost more than $15, the neural network 223 may determine that the user has a preference of purchasing e-books that are under $15.

In some cases, based on previous instances of advanced data content retrieval operations, the neural networks 223 may determine that a user has a strong preference to perform an advanced content retrieval operation when the user device 223's remaining battery power is equal to or greater than a particular threshold, e.g., 25%, of the user device 220's total battery power. In some cases, based on previous instances of advanced data content retrieval operations, the neural networks 223 may determine that a user has a strong preference to perform an advanced content retrieval operation only if the wireless signal strength for network connection is equal to or greater than a particular network connection threshold, e.g., 25%.

In some implementations, the neural networks 223 be integrated with a recommendation engine 222, and, in some implementations, the neural networks 223 may be separate from but connected to a recommendation engine 222. The recommendation engine 222 may generate recommendations for apps that have registered with the app manager 224 according to one or more of user settings, predictions provided by the neural networks 223, confidence levels, and one or more parameters such as an amount of time the user anticipates not having access to a network, a time duration that the user is likely to remain wirelessly connected, an identification of the content to acquire, a size limit for the content to be acquired, an app for which the content is to be used with, a financial threshold for acquiring the content, a minimum battery threshold to sustain while acquiring the content, and a minimum network connectivity threshold while acquiring the content.

The user settings may include, but are not limited to, one or more of settings that specify apps for which recommendations should be provided for, locations for which recommendations should be provided for, a time duration or period to provide the recommendation before a time when network connection below a network connectivity threshold is predicted, a confidence threshold for predictions, and whether the user would like to receive confirmation notifications.

For example, in some cases, a user may specify that only recommendations for apps related to navigation services such as Google Maps should be provided. In some cases, a user may specify that recommendations should only be provided when the user is expected to travel or when the user is at a particular location, such as an airport. In some cases, the user may select an option that the user device 220 must request confirmations for the recommendations generated by the recommendation engine 222 or an option that the user device 220 should execute the recommendations automatically without user confirmation. In some cases, the user may specify that only predictions that have a particular confidence threshold, e.g., 60% or more, should generate corresponding recommendations. If the user does not provide information regarding particular settings, the recommendation engine 222 may use default values for the particular settings.

The recommendation engine 222 may receive one or more predictions from the neural networks 223, determine a confidence level associated with the predictions, filter the predictions based on the user settings and confidence levels, and generate a recommendation based on the predictions that have passed the filtering. The generated recommendations may be displayed to the user through the AIR interface and may include an indication of the determined confidence level associated with a particular recommendation.

A confidence level may indicate a degree of certainty or relevance of a prediction to a user. The confidence level may be based on one or more of the user's activity log, the user's settings, and default confidence levels set by an app for certain predictions. As an example, the neural network 223 may generate a prediction that, in 48 hours, the user is likely to go camping where the user does not have internet connection and that the user may want to download a movie before going camping. If the user has frequently downloaded a movie before going camping, for example in six out of eight of the user's previous camping trips, the recommendation engine 222 may assign a high confidence level to the prediction. In contrast, if the user has infrequently downloaded a movie before going camping, for example in less than four out of eight previous camping trips, or if the user has only gone camping once before, the recommendation engine 222 may assign a low confidence level to the prediction.

In another example, the neural network 223 may generate a prediction that the user will likely request navigation instructions through a navigation app when returning from a remote location with little or no network access, such as a camping location, in three days. The navigation app may assign a high confidence level for predictions of the user likely wanting to obtain navigation instructions when the user is predicted to be at a location without network access. Thus, the recommendation engine 222 may assign a high confidence level to the prediction of the user likely wanting to obtain driving instructions from the camping location back to the user's home.

In some implementations, the neural networks 223 may query the user if the recommendation engine 222 determines that a particular prediction has a low confidence level. For example, if a prediction that the user will have a low signal connectivity in 3 hours time is assigned a low confidence level, the neural networks 223 may output a question through user interface 226 asking the user, for example, "Do you anticipate having low wireless signal connectivity in 3 hours?" Based on user feedback to the query, the neural networks 223 may update its prediction and improve its confidence level in the updated prediction.

After obtaining a prediction and a confidence level associated with the prediction, the recommendation engine 222 may then filter the prediction based on user settings and a confidence level associated with the prediction. For example, the user may have previously indicated that the user is not interested in receiving any recommendations for an electronic book reading app. Thus, even though the neural networks 223 may predict that the user will likely read a book at a time in future when the user device 220 is likely to be disconnected from a network, the recommendation engine 222 will assign a high confidence level but still filter the prediction out due to user preferences. As another example, a user may have previously indicated that the user is not interested in viewing recommendations that are more than a particular time period, e.g., 1 hour, before the time that a network connection of the user device 220 falls below a network connectivity threshold.

In some implementations, the recommendation engine 222 is configured to filter out predictions that have a determined confidence level of less than a particular threshold, e.g., 50% confidence level. In some implementations, a tiered filtering schedule may be implemented. For example, for predictions that have a confidence level greater than a first threshold, e.g., 80%, the recommendation engine 222 may allow the prediction to pass and may not request any feedback from the user. For predictions that have a confidence level greater than a second threshold, e.g., 30%, but less than or equal to the first threshold, e.g., 80%, the recommendation engine 222 may be configured to query the user to determine if the user is interested in a particular prediction. A user response to the query may then be logged into the user activity log data. For predictions that have a confidence level less than or equal to the second threshold, e.g., 30%, the recommendation engine 222 may be configured to filter out such predictions and not to generate any recommendations for such predictions.

After a particular prediction passes the filtering or is flagged as being of interest to the user in response to the query, the recommendation engine 222 may generate a recommendation with the particular prediction. In some implementations, the recommendation may include a confidence indicator, which is a graphical representation of the determined confidence level for the prediction in the recommendation. The graphical representation may be output in various suitable manner such as, for example, numerically, by color, text, an icon, or using an audio signal.

For example, in some cases, a recommendation may be displayed in a green color if the recommendation has a high confidence level or a recommendation may be displayed in a red color if the recommendation has a low confidence level. In some cases, a recommendation may be displayed with a thumbs-up graphical icon if the recommendation has a high confidence level or a recommendation may be displayed with a thumbs-down graphical icon if the recommendation has a low confidence level. In some cases, a number indicative of the confidence level may be displayed along with the recommendation.

In some implementations, the generated recommendation may be customized according to user preferences specified by the user or provided by training data that trained the neural networks 223. For example, the generated recommendation may be performed only at particular times, signal levels, or battery levels that the neural networks 223 have determined are preferred by the user. For example, as described above and depicted in FIG. 1A, the neural networks 223 may determine that a user likes to download e-books that cost less than $15 before boarding a flight. The recommendation engine 222 may then customize the e-book recommendation generated for an electronic book reader app in the user device and customize the recommendation with cost information, timing information that the neural networks 223 have learnt are user preferences, and an associated confidence level, e.g., 85%.

In some implementations, the user may adjust the timing for certain recommendations based on the anticipated battery usage. For example, the neural networks 223 may predict that the battery for the user device will last a certain period of time, e.g., another two hours, according to the user's typical battery consumption pattern during a day. If there is a prediction for a time period without network connectivity that occurs after the likely duration of battery life, the recommendation engine 222 may modify the timing of the recommendation and provide an earlier recommendation to download data in view of the likely lack of battery power in future. Thus, in the example shown in FIG. 1A, if the neural networks 223 determined that the power to user device's battery was likely to be finished by 2:30 PM, the recommendation engine 222 may recommend the downloading of the e-book at a time before 2:30 PM.

If the user has previously selected the option to obtain user confirmation of recommendations, a generated recommendation will include a request for the user to confirm the recommendation, as shown in FIG. 1A. If the user has not previously selected the option to obtain user confirmation of recommendations, the user device 220 may automatically initiate execution of a recommendation and will display a notification through the AIR interface indicating that the user device 220 is about to execute an operation according to a recommended action. For example, the user device 220 may display a message to the user through the AIR interface indicating that the user device 220 will begin downloading an e-book for under $15 in a few minutes or at a particular time, e.g., 30 minutes before departure. In some implementations, along with the message, the user may be presented with a selectable button to cancel the downloading operation. The user may then select the cancel button if the user does not want to download the e-book in the manner recommended by the recommendation engine 222.

Although the implementations described above include descriptions of operations performed by the user device 220, in some implementations, some or all of the one or more operations executed to generate recommendations and obtain content may be performed by a server or, in general, any computer system connected to the user device 220.

Figure 3:
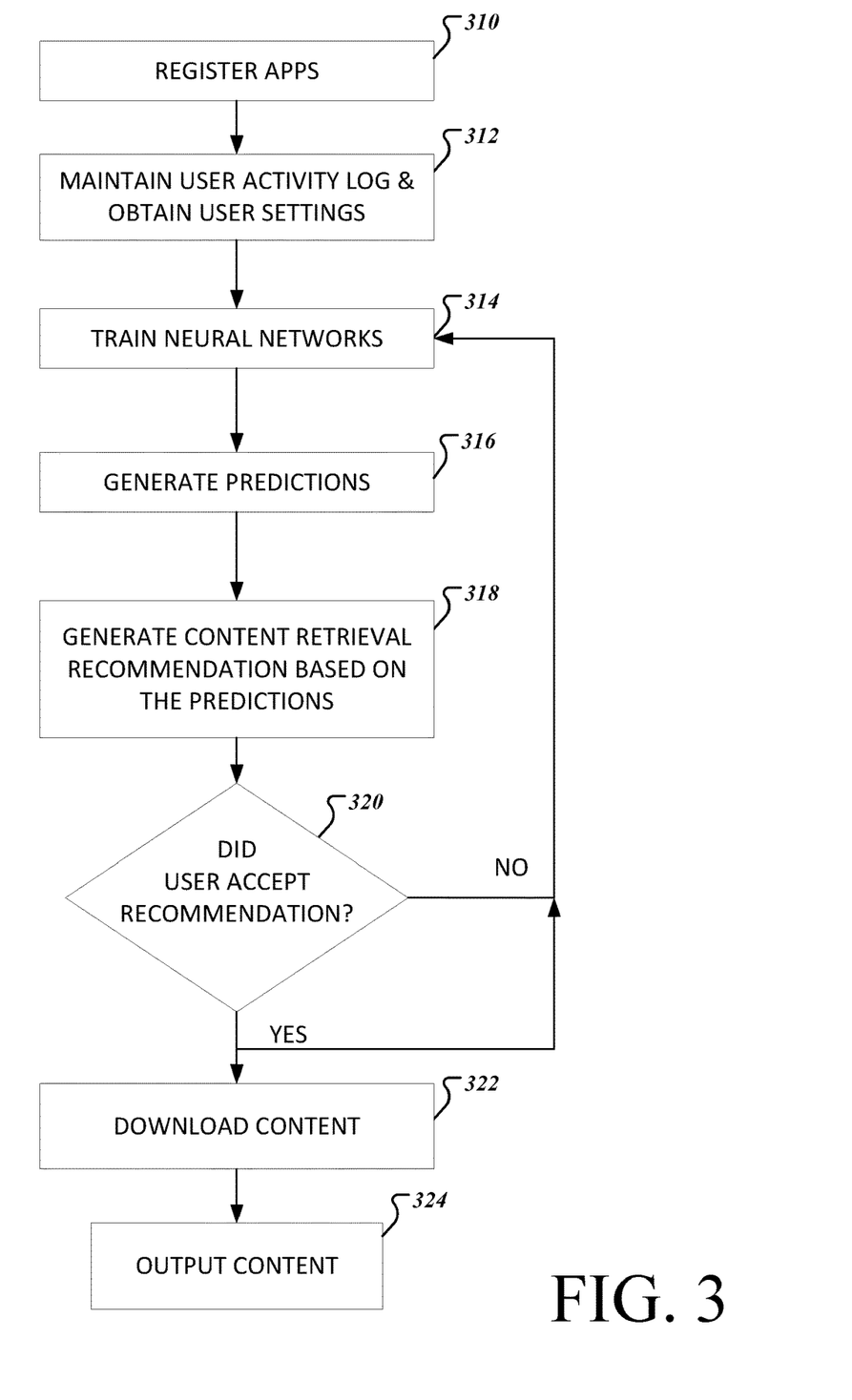
FIG. 3 depicts a flowchart of an exemplary method for advanced content retrieval.

FIG. 3 depicts a flowchart of an exemplary method for advanced content retrieval. For convenience, the following description will refer to the operations depicted in FIG. 3 as being conducted by a system. The system may refer to a user device, or a server, a computer network, or system with one or more computing devices and processors that is connected to a user device. Although the operations are depicted in a certain order in FIG. 3, the operations may be conducted in different orders.

Referring to FIG. 3, the system may register one or more apps for an advanced content retrieval service (310). As noted above, apps may subscribe to the advanced content retrieval service by registering with an app manager in the system. In some cases, a user may select an app to receive content in advance. App registration includes storing data indicative of one or more of an app, functions within an app, content to be obtained in advance, and any parameters or limitations for the type of content the app is interested in obtaining in advance. Upon registering an app, the system provides an application programming interface (API) to the registered app. Recommendations for particular apps may be sent through the respective APIs for each app.

The system also maintains a user activity log (312). The user activity log may include data indicative of one or more of the user's phone usage patterns, operations executed by the apps, a frequency of use of apps, and frequency of functions executed by the used apps. The user activity log may also include data indicative of one or more of user movement, user location, user travel plans, shopping transactions, banking transactions, and social media interactions. The user activity log may be stored in a database, server, or the user device. As noted above, a user may control the manner in which user data is collected and stored such that no personally identifiable information can be determined.

In addition to maintaining a user activity log, the system also obtains user settings and preferences (312). As noted above, the user settings and preferences may include one or more of permissions to collect user information, battery, financial, and network connectivity thresholds for advance content retrieval, user preferences and selections made through the apps, apps or app functions permitted to participate in advanced content, locations for which recommendations should be provided for, a time duration or period to provide the recommendation before a time when network connectivity below a network connection threshold is predicted, a confidence threshold for predictions, and whether the user would like to receive notifications requesting confirmation of recommendations.

In some implementations, the user settings and preferences may be obtained by virtue of the inputs and selections made by the user through the AIR interface. Various suitable methods of receiving user inputs and selections may be utilized. For example, user inputs may be received through one or more of a motion sensor, gyroscope, or haptic feedback sensor, mouse, keyboard, and touch screen. In some implementations, the system may determine the user settings and preferences through neural network predictions as described above.

The user activity log data and user settings and preferences data may be used as training data to train one or more neural networks (314). As described above, the neural networks may collect data from various signals, use the collected data for training, and generate predictions. The neural networks may execute one or more computations required for training machine learning models. In general, any suitable neural network model may be used, including but not limited to, a Recurrent Neural Network (RNN), Gated Recurrent Unit (GRU), Long Short-Term Memory (LSTM), or a large Feed Forward Neural Network.

The training includes determining disconnected time periods in the past when the user device had network connectivity below a particular signal threshold level, and determining corresponding conditions associated with the disconnected time periods. These corresponding conditions may include a location of the user device immediately before, during, and immediately after the disconnected time periods, an activity that the user was likely engaged in immediately before, during, and immediately after the disconnected time periods, an app or operation that is executed immediately before, during, and immediately after the disconnected time periods, and data that is accessed immediately before, during, and immediately after the disconnected time periods.

After the training, the system may generate one or more predictions for the registered apps (316). In particular, the system may identify trigger conditions or likely time periods (referred generally to as disconnected time periods) when network connectivity is likely to be below a network connectivity threshold, and determine likely corresponding conditions during the disconnected time periods. The corresponding conditions may include a likely location of a user device, an activity that the user will likely be engaged during the likely disconnected time period, and an app or operation likely to be executed at the likely disconnected time period.

In some implementations, if the user has not provided any information indicating a time duration that the user is likely to remain wirelessly connected, the system may predict the time duration. For example, if a user utilized an electronic boarding pass at the airport, the user device may determine that the user device may have wireless connection access from the current or present time to the boarding time of the flight. In general, the system may obtain data that indicates a time at which a likely change in the wireless connection status or a physical environment of the user device will occur. The system may then calculate the difference from the present time to the time at which a likely change in the wireless connection status or a physical environment of the user device will occur. The calculated time difference may correspond to the time duration that the user is likely to remain wirelessly connected.

In some implementations, the system may search the user device's location history and determine if the user device has been in the present location before. If the user device has been in the present location before, the system may calculate an average amount of time the user device typically remains in the location, and set this average time as the time duration that the user is likely to remain wirelessly connected.

In some implementations, the system may determine the likely wireless connection strength for the amount of time the user is likely to be connected to a network. The system may use one or more signals to determine the likely wireless connection strength. For example, in some cases, the system may search the user device's location history and determine if the user device has been in the present location before. If the user device has been in the present location before, the system may determine the average wireless signal strength that the user device had when located in the present location in the past. The past average wireless signal strength and the current signal strength may be used as factors and weighed to determine the likely wireless connection strength.

In some cases, the system may determine the likelihood of the user's device wireless connectivity status to change based on the user device's location. For example, if the system determines that the user device's location is rapidly changing or that the user device is moving in a pattern that corresponds to vehicular movement, the system may determine that the wireless connectivity of the user device is likely to change frequently and may not remain at the present connectivity level.

In some cases, the system may determine that the user device is located at a building or facility, such as a shopping mall, office, school, or café, and that the user device's position is not changing. The system may then determine that the wireless connectivity level is likely to remain unchanged at the existing connectivity level. As should be appreciated from the foregoing, various methods may be used to determine the likely wireless connection strength of the user device for the amount of time the user is likely to remain wirelessly connected.

The system may also predict the likely content to be obtained during the likely disconnected time periods. The likely content to be obtained may vary according to the app for which the content is being obtained for. In some implementations, to identify content to be included in a prediction, the system may communicate with an app and determine the content that can be provided to or requested by the app. For instance, the system may communicate with an e-book app installed in the user device to obtain data identifying the next book on the user's wish list. As another example, the content obtained for an entertainment app may be a mini-series episode, a movie, or an audio song that is on a wish list of a user. A wish list may refer to data that the user does not yet have access to or has not yet downloaded onto the user device, but would like to access in future. Content obtained for a navigation app may include directions to and from a particular destination that the user is anticipated to travel to during the likely disconnected time period. Thus, the system may predict one or more likely disconnected time periods and the likely content to be obtained during the likely disconnected time periods.

In some implementations, after determining a data size or file size of the content to be acquired from the one or more resources and the likely strength of the wireless connection, the system may determine the time required to acquire the content based on the likely wireless connection strength. For example, the system may predict the likely data rate at which data will be received at the likely wireless connection strength, and utilize the likely data rate to determine the likely time required to acquire the content. The system may compare the likely time required to acquire the content with the time duration that the user device is likely to remain wirelessly connected to determine if sufficient time is available to acquire the content. In some cases, as shown in exemplary TABLE I below, the system may also calculate the time required to acquire the content based on variations in the likely wireless connection strength.

TABLE I

| Content Size | Likely Wireless Connectivity | Time Required | Time Available | Sufficient time? |
|---|---|---|---|---|
| 10 MB | Excellent (95%) | 5 mins | 10 mins | Yes |
| 10 MB | Good (75%) | 8 mins, 30 sec | 10 mins | Yes |
| 10 MB | Poor (40%) | 12 mins | 10 mins | No |
| 10 MB | Very poor (5%) | 20 mins | 10 mins | No |

The data shown in TABLE I is for illustrative purposes. As noted in TABLE I, when the size of the content is 10 MB, the system may determine that the content may be acquired from a resource at wireless connectivity strengths of 75% or 95% of the maximum signal strength, but not for wireless connectivity strengths of 40% or 5% because the content will not have been downloaded from the resource in the available time.

The system may also implement other variations of TABLE I that include, for example, variations in the likely wireless connection strength, variations in the content size based on the different resources, variations in the user device's battery levels, and any other relevant variation.

As described above, a recommendation engine may receive one or more predictions from the neural networks, determine a confidence level associated with the predictions, filter the predictions based on the user settings and confidence levels, and generate a recommendation based on the predictions that have passed the filtering (318). The recommendations may be generated according to one or more of user settings, predictions provided by the neural networks, confidence levels, and one or more parameters such as an amount of time the user anticipates not having access to a network, a time duration that the user is likely to remain wirelessly connected, an identification of the content to acquire, a size limit for the content to be acquired, an app for which the content is to be used with, a financial threshold for acquiring the content, a minimum battery threshold to sustain while acquiring the content, and a minimum network connectivity threshold while acquiring the content.

In some implementations, prior to generating a recommendation, the system may identify one or more sources from which content can be obtained from and determine whether the content acquisition satisfies downloading conditions. For example, the system may conduct a search for content to be obtained and filter the search results to identify one or more resources from which the content can be obtained. The system may then communicate with the identified one or more resources to obtain acquisition data such as a size of the content to be obtained and a cost to purchase the content. The cost to purchase content may include any cost associated with the purchase such as, for example, a cost to access the Internet or wireless network, to complete an online purchase. Based on the acquisition data, the system may i) determine whether the user device has sufficient storage available to store the content; ii) determine how long it may take to download the content and one or more variations in the predicted download time period based on variations in the wireless network signal strength, and iii) determine whether the costs associated with acquiring the content satisfy a user's financial threshold.

In some implementations, the financial threshold for acquiring the content may include a maximum amount of money (e.g., dollars) the user is willing to spend on acquiring content. In some implementations, the financial threshold may be predicted by the neural networks based on previous user financial transactions involving similar type of content. In some implementations, a user may set the financial threshold. When providing financial threshold information, the user may also provide payment information for processing payments, such as credit card information or a payment service account. The payment information may be used to process any payments to acquire content.

The user settings may include, but are not limited to, one or more of settings that specify which apps recommendations should be provided for, locations for which recommendations should be provided for, financial thresholds for particular apps, a time duration or period to provide the recommendation before a disconnected time period is predicted, a confidence threshold for predictions, and whether the user would like to approve or confirm the generated recommendations.

In some implementations, the minimum battery threshold to sustain while acquiring content and the minimum network connectivity threshold during the time content is being acquired may include percentage thresholds. For example, the system may determine that the user preference for a minimum network connectivity level is, for example, 30% of maximum signal connectivity, and a minimum battery power level is, for example, 10% of maximum battery levels, when downloading content. The 30% and 10% levels may be set as the minimum network connectivity threshold and the minimum battery threshold, respectively. The system may then only generate recommendations for obtaining content when the user device predicts a likely wireless signal strength and battery level that is above these minimum thresholds during the disconnected time period.

Based on the above-noted determinations and operations, the system may determine whether content can be acquired. For example, in some implementations, the system may determine that the content can be acquired if one or more of the following conditions are satisfied: the user device is predicted to sustain a battery level greater than the minimum threshold level provided by the user for the time duration that the user is likely to remain wirelessly connected; the user device is predicted to sustain a wireless connection level greater than the minimum threshold level provided by the user for the time duration that the user is likely to remain wirelessly connected; payment for accessing the content can be made based on the user-provided financial threshold; the content can be obtained from one or more resources; a data size of the content is equal to or less than the available storage in the user device; and a time available to acquire the content exceeds the time required to acquire the content. If the content can be acquired, a recommendation is generated.

The generated recommendations may be displayed to the user through the AIR interface and may include an indication of the determined confidence level associated with a particular recommendation. In some implementations, if the user has indicated that the user would prefer to approve or confirm generated recommendations, the system may display a notification that queries whether the user would like to accept the recommendation.

The system may then receive a response from the user indicating whether the user accepted or rejected the generated recommendation (320). The user's response may be recorded in the user activity log data and used to further train the neural networks (314). For example, if a recommendation is repeatedly rejected by the user more than a threshold number of times, the system may then filter out future predictions that correspond to the rejected recommendation.

If the user accepts the generated recommendation, the content noted in the recommendation is downloaded upon satisfaction of the conditions and time included in the recommendation (322). The content may be downloaded from any suitable data source such as a server, database, or network storage device, and may be cached in a memory local to the user device so that the user device can access the content at any point in future. To download content, the system may execute any operation to obtain the content. For example, the system may conduct content searching operations, payment-processing operations, and operations to connect with one or more content providers.

The downloaded and stored content may be output at any time of the user's choice (324). In some implementations, the user may open an app and select the content for output at a time when the user device is not connected to any network such as the Internet. In general, the content may be output in various ways. For example, if the downloaded content corresponds to a media file, the downloaded content may be output as an audio signal. In some cases, the downloaded content may be output through a display device connected or coupled to the user device.

Figure 4:
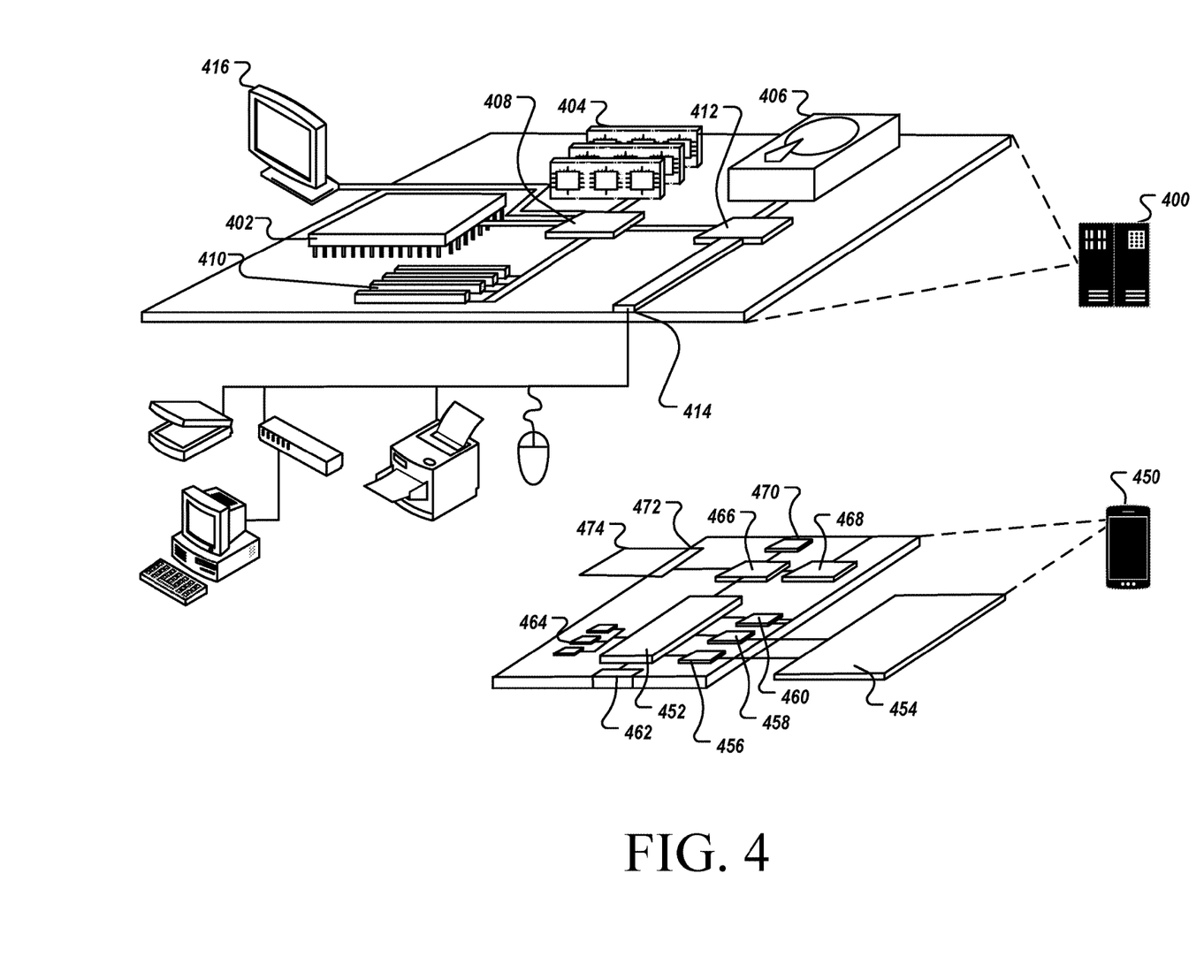
FIG. 4 depicts an exemplary system that provisions advanced content retrieval.

Embodiments and all of the functional operations and/or actions described in this specification may be implemented in digital electronic circuitry, or in computer software, firmware, or hardware, including the structures disclosed in this specification and their structural equivalents, or in combinations of one or more of them. FIG. 4 is a block diagram of computing devices 400, 450 that may be used to implement the systems and methods described herein. Computing device 400 represents various forms of digital computers, such as workstations, servers, blade servers, mainframes, and other appropriate computers. Computing device 450 represents various forms of user devices, such as personal digital assistants, cellular telephones, smartphones, smart televisions, watches, and other similar computing devices. The components shown here, their connections and relationships, and their functions, are exemplary, and do not limit implementations described herein.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners. The processor 402 can process instructions for execution within the computing device 400, including instructions stored in the memory 404 or on the storage device 406 to display graphical information for a GUI on an external input/output device, such as display 416 coupled to high speed interface 408. In some implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system). In general, the processor 402 may control operations of the computing device 400, and may include various logic circuitry and programs to execute implementations described herein The memory 404 stores information within the computing device 400. In some implementations, the memory 404 may include one or more of a computer-readable medium, a volatile memory unit(s), or a non-volatile memory unit(s).

The storage device 406 is capable of providing mass storage for the computing device 400. In some implementations, the storage device 406 may include one or more mass storage devices, for example, magnetic, magneto optical disks, optical disks, EPROM, EEPROM, flash memory devices, and may be implemented as internal hard disks, removable disks, magneto optical disks, CD ROM, or DVD-ROM disks for storing data. In some implementations, the storage device 406 may include a non-tangible computer-readable storage medium that contains instructions, which when executed, perform one or more methods or portions of the methods described above. In some implementations, the storage device 406 may store rules for determining whether content can be acquired based on one or more parameters provided by a user.

The high-speed controller 408 manages bandwidth-intensive operations for the computing device 400, while the low speed controller 412 manages lower bandwidth-intensive operations. Such allocation of duties is exemplary. In some implementations, the high-speed controller 408 is coupled to memory 404, display 416 (e.g., through a graphics processor or accelerator), and to high-speed expansion ports 410, which may accept various expansion cards (not shown). In some implementations, a low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, computing device 400 may be implemented as a standard server 420, a group of such servers, or as part of a rack server system. The server 420 may be, for example, one or more of a network server, a playlist sharing application server, a content server, a playlist management server. In some implementations, the computing device 400 may be implemented as a personal computer such as a laptop computer.

In some implementations, the computing device 400 may wirelessly communicate with device 450 over one or more networks to execute one or more operations of the method described in FIG. 3. In some implementations, the computing device 400, when operating as a content provider, may receive a request for content from device 450 and, in response, may provide the requested content to device 450. In some implementations, the computing device 400 execute one or more of the operations illustrated in FIG. 3 and may control device 450 to display the AIR and fetching parameter interfaces and to receive user inputs.

The one or more networks connecting computing devices 400 and 450 may include access points, storage systems, cloud systems, modules, one or more databases including one or more media databases, and servers including one or more network servers such as computing device 400. The one or more network servers may include any suitable computing device coupled to the one or more networks, including but not limited to a personal computer, a server computer, a series of server computers, a mini computer, and a mainframe computer, or combinations thereof. The one or more network servers may also include an application server, a web server, or a series of servers, running a network operating system, examples of which may include but are not limited to Microsoft® Windows® Server, Novell® NetWare®, or Linux®. The one or more network servers may be used for and/or provide cloud and/or network computing and media provision services. Although not shown in the figures, the server may have connections to external systems providing messaging functionality such as e-mail, SMS messaging, text messaging, and other functionalities, such as advertising services, search services, etc.

In some implementations, the one or more networks may include a cloud system that may provide Internet connectivity and other network-related functions. For example, the cloud system may provide storage services for at least a portion of the data transmitted between components of the system.

The cloud system or one or more networks may also include one or more databases, which may include a media storage database, a media provision database, a cloud database, or a database managed by a database management system (DBMS). A DBMS may be implemented as an engine that controls organization, storage, management, and retrieval of data in a database. DBMSs frequently provide the ability to query, backup and replicate data, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Computing device 450 may include a processor 452, memory 464, a user interface such as a display 454, a communication interface 466, and a transceiver 468, among other components. Each of the components 450, 452, 464, 454, 466, and 468, may be interconnected using various buses, and several of the components may be mounted on a common motherboard or in other manners as appropriate.

The transceiver 468 may include a transmitter and a receiver and may be utilized to communicate with devices in the one or more networks and components within computing device 450. The transceiver 468 may include amplifiers, modulators, demodulators, antennas, and various other components. The transceiver 468 may direct data received from other external devices, such as servers, databases, portable devices connected to a wireless network, to other components in the computing device 450 such as the processor 452 and memory 464. The transceiver 468 may also direct data received from components in the computing device 450 to external devices.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide location services and additional wireless data to device 450, which may be used by applications running on device 450.

Memory 464 stores information within the computing device 450, and, in some implementations, may also be coupled to one or more additional storage devices to provide additional storage. The memory 464 may include a computer-readable storage medium or store one or more modules of computer program instructions encoded on a computer-readable storage medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal that is generated to encode information for transmission to suitable receiver apparatus.

A computer program, also known as a program, software, software application, script, plug-in, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be deployed to be executed on one computer or on multiple computers that are located at one site or distributed across multiple sites and interconnected by a communication network.

In some implementations, the memory 464 may be a volatile memory unit or units. In some implementations, the memory 464 may be a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. For example, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, one or more mass storage devices, for example, magnetic, magneto optical disks, optical disks, EPROM, EEPROM, flash memory devices, and may be implemented as internal hard disks, removable disks, magneto optical disks, CD ROM, or DVD-ROM disks for storing data. In some cases, the memory may store rules for training neural networks, and may include a cache for temporarily storing the acquired content.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450. Generally, a processor may control operations of the computing device 450, and may include various logic circuitry and programs to execute the various implementations described herein.

Processor 452 may communicate with a user through a user interface that includes a control interface 458 and display interface 456 coupled to a display 454. The display 454 may be implemented through suitable displays including, for example, a projection display, a liquid crystal display (LCD), or light emitting diode (LED) display, to display various data. For example, in some implementations, the display of the user interface 326 may display the AIR interface or the fetching parameter interface. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The audio codec 460 may, in some cases, be connected to or implemented with a microphone or speaker. In some implementations, messages, such as a rejection message indicating that the requested content may not be acquired using the fetching parameter values provided by the user, may be communicated through audio signals emitted from speakers. In some implementations, certain applications, such as speech-to-text applications may be executed by receiving audio or voice signals through the microphone.

Although not shown, computing device may also include sensors and input unit(s). Sensors may include, for example, an optical sensor, capacitive sensor, charge-coupled device sensor, gyroscope, microphone, altimeter, impact sensor, piezoelectric sensor, motion sensor, biosensor, active pixel sensor, and various other sensors. The input unit(s) may include various devices that are configured to receive one or more inputs. For example, the input unit may include a mouse, touch pad, or keyboard for receiving alphanumeric text.

The implementations noted above describe exemplary scenarios, systems, and methods in which a system predicts and downloads content before a time the user anticipates not having access to a wireless network connection. Similar implementations may be executed in order to upload content before a time the user anticipates not having wireless connection. For example, a system may anticipate that the user is likely not to have access to the Internet at some time in future, and may provide recommendations for the user device to upload data from the user device to a particular destination, such as a cloud network, database, or server. If the user agrees with the recommendation, the system may then upload content at the recommended time.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A computer-implemented method comprising:
   training a neural network system using activity log data;
   by one or more computing devices and based on the training of the neural network system using the activity log data:
   identifying a first previous time period of intermittent network connectivity in which one or more conditions were satisfied, wherein at least one of the one or more conditions includes a threshold battery level,
   determining a content type obtained by a user during the first previous time period associated with the one or more conditions being satisfied,
   determining a first future time period of intermittent network connectivity during which the one or more conditions will be satisfied, wherein determining the first future time period includes determining the first future time period as extending from a first particular future time to a second particular future time that occurs after the first particular future time, and
   generating a notification that includes a recommendation to schedule acquisition of data of the content type at the first particular future time and upon satisfaction of the one or more conditions;
   presenting, by the one or more computing devices and prior to the first particular future time, the notification that includes the recommendation at a display of a particular computing device of the one or more computing devices, wherein the first particular future time and the one or more conditions are visible, in the notification, to a user of the particular computing device;
   receiving, by the one or more computing devices, in response to presenting the notification, and prior to the first particular future time, a responsive user input indicating user acceptance or rejection of the recommendation to schedule acquisition of the data at the first particular future time and upon satisfaction of the one or more conditions for acquiring the data at the first particular future time, wherein the one or more conditions for acquiring the data are in addition to the first particular future time; and
   in response to receiving the responsive user input indicating user acceptance of the recommendation:
   obtaining, by the one or more computing devices from one or more content delivery servers and based on the one or more conditions being satisfied, the data of the content type at the first particular future time;
   further training the neural network system based on the user acceptance of the recommendation to schedule acquisition of the data at the first particular future time and upon satisfaction of the one or more conditions, as indicated by the received responsive user input;
   determining, using the further trained neural network system, a particular output time during the determined first future time period to output the obtained data; and
   controlling, by the one or more computing devices, a display to output the obtained data at the particular output time.

2. The computer-implemented method of claim 1, wherein:
   the one or more conditions include a content type, a content size, a location, a financial threshold to purchase the data, and a wireless connectivity threshold; and the activity log data includes activity data indicative of user behavior.

3. The computer-implemented method of claim 1, wherein determining the first future time period and the one or more conditions for acquiring data based on the training of the neural network system using the activity log data includes:
  determining one or more of:
    a size of the content type;
    a likely financial cost of obtaining the data at the first particular future time; and
    an availability of funds to pay for the likely financial cost.

4. The computer-implemented method of claim 1, wherein determining the first future time period includes:
  determining a likely level of wireless connectivity of a user device during the first future time period;
  determining a probability that an entirety of the data is downloadable at the determined likely level of wireless connectivity during the first future time period; and
  determining that the probability exceeds a confidence threshold.

5. The computer-implemented method of claim 1, further comprising:
  controlling, by the one or more computing devices, an output device to output the notification the output device including the display,
  wherein the user input is received using a graphical user interface displayed by the display.

6. The computer-implemented method of claim 1, wherein the particular output time is a time at which a user device including the display and the one or more computing devices are not connected to a wireless network.

7. The computer-implemented method of claim 1, wherein determining the first future time period and the one or more conditions for acquiring data based on the training of the neural network system using the activity log data includes:
  determining one or more applications that are configured to obtain application data at a particular time before outputting the application data using the one or more applications; and
  determining a particular content type of the application data, a content size of the application data, a likely financial cost of obtaining the application data at the first particular future time, and an availability of funds to pay for the likely financial cost.

8. One or more non-transitory computer-readable storage media comprising instructions, which, when executed by one or more computing devices, cause the one or more computing devices to perform operations comprising:
  training a neural network system using activity log data;
  based on the training of the neural network system using the activity log data:
    identifying a first previous time period of intermittent network connectivity in which one or more conditions were satisfied, wherein at least one of the one or more conditions includes a threshold battery level,
    determining a content type obtained by a user during the first previous time period associated with the one or more conditions being satisfied,
    determining a first future time period of intermittent network connectivity during which the one or more conditions will be satisfied, wherein determining the first future time period includes determining the first future time period as extending from a first particular future time to a second particular future time that occurs after the first particular future time, and
    generating a notification that includes a recommendation to schedule acquisition of data of the content type at the first particular future time and upon satisfaction of the one or more conditions;
  presenting, prior to the first particular future time, the notification that includes the recommendation at a display of a user device, wherein the first particular future time and the one or more conditions are visible, in the notification, to a user associated with the user device;
  receiving, in response to presenting the notification and prior to the first particular future time, a responsive user input indicating user acceptance or rejection of the recommendation to schedule acquisition of the data at the first particular future time and upon satisfaction of the one or more conditions, wherein the one or more conditions for acquiring the data are in addition to the first particular future time; and
  in response to receiving the responsive user input indicating user acceptance of the recommendation:
    obtaining, from one or more content delivery servers and based on the one or more conditions being satisfied, the data of the content type at the first particular future time;
    further training the neural network system based on the user acceptance of the recommendation to schedule acquisition of the data at the first particular future time and upon satisfaction of the one or more conditions, as indicated by the received responsive user input;
    determining, using the further trained neural network system, a particular output time during the determined first future time period to output the obtained data; and
    controlling a display to output the obtained data at the particular output time.

9. The one or more non-transitory computer-readable storage media of claim 8, wherein:
  the one or more conditions include the content type, a content size, a location, a financial threshold to purchase the data, and a wireless connectivity threshold;
  the activity log data includes activity data indicative of user behavior; and
  the particular output time is a time at which the user device including the display is not connected to a wireless network.

10. The one or more non-transitory computer-readable storage media of claim 8, wherein determining the first future time and the one or more conditions for acquiring data based on the training of the neural network system using the activity log data includes determining one or more of:
  a size of the content type;
  a likely financial cost of obtaining the data at the first particular future time; and
  an availability of funds to pay for the likely financial cost.

11. The one or more non-transitory computer-readable storage media of claim 8, wherein determining the first future time period includes:
  determining a likely level of wireless connectivity of the user device during the first future time period;
  determining a probability that an entirety of the data is downloadable at the determined likely level of wireless connectivity during the first future time period; and
  determining that the probability exceeds a confidence threshold.

12. The one or more non-transitory computer-readable storage media of claim 8, wherein determining the first future time period and the one or more conditions for acquiring data based on the training of the neural network system using the activity log data includes:
  determining one or more applications that are configured to obtain application data at a particular time before outputting the application data using the one or more applications; and
  determining a content type of the application data, a content size of the application data, a likely financial cost of obtaining the application data at the first particular future time, and an availability of funds to pay for the likely financial cost.

13. A system comprising:
one or more computers and one or more storage devices storing instructions that are operable and when executed by one or more computers, cause the one or more computers to perform actions comprising:
  training a neural network system using activity log data;
  based on the training of the neural network system using the activity log data:
    identifying a first previous time period of intermittent network connectivity in which one or more conditions were satisfied, wherein at least one of the one or more conditions includes a threshold battery level,
    determining a content type obtained by a user during the first previous time period associated with the one or more conditions being satisfied,
    determining a first future time period of intermittent network connectivity during which the one or more conditions will be satisfied, wherein determining the first future time period includes determining the first future time period as extending from a first particular future time to a second particular future time that occurs after the first particular future time, and
    generating a notification that includes a recommendation to schedule acquisition of data of the content type at the first particular future time and upon satisfaction of the one or more conditions;
  presenting, prior to the first particular future time, the notification that includes the recommendation at a display of a user device associated with a user, wherein the first particular future time and the one or more conditions are visible, in the notification, to the user of the user device;
  receiving, in response to presenting the notification and prior to the first future time, a responsive user input indicating a user acceptance or rejection of the recommendation to schedule acquisition of the data at the first particular future time and upon satisfaction of the one or more conditions for acquiring the data at the first particular future time; and
  in response to receiving the responsive user input indicating user acceptance of the recommendation:
    obtaining, one or more content delivery servers and based on the one or more conditions being satisfied, the data of the content type at the first particular future time;
    further training the neural network system based on the user acceptance of the recommendation to schedule acquisition of the data at the first particular future time and upon satisfaction of the one or more conditions, as indicated by the received responsive user input;
    determining, using the further trained neural network system, a particular output time during the determined first future time period to output the obtained data; and
    controlling a display to output the obtained data at the particular output time.

14. The system of claim 13, wherein:
the one or more conditions include the content type, a content size, a location, a financial threshold to purchase the data, and a wireless connectivity threshold;
the activity log data includes activity data indicative of user behavior; and
the particular output time is a time at which a user device including the display and the one or more computers is not connected to a wireless network.

15. The system of claim 13, wherein determining the first future time period and the one or more conditions for acquiring data based on the training of the neural network system using the activity log data includes determining one or more of:
  a size of the content type;
  a likely financial cost of obtaining the data at the first particular future time; and
  an availability of funds to pay for the likely financial cost.

16. The system of claim 13, wherein determining the first future time period includes:
  determining a likely level of wireless connectivity of the user device during the first future time period;
  determining a probability that an entirety of the data is downloadable at the determined likely level of wireless connectivity during the first future time period; and
  determining that the probability exceeds a confidence threshold.

17. The system of claim 13, wherein determining the first future time period and the one or more conditions for acquiring data based on the training of the neural network system using the activity log data includes:
  determining one or more applications that are configured to obtain application data at a particular time before outputting the application data using the one or more applications; and
  determining a content type of the application data, a content size of the application data, a likely financial cost of obtaining the application data at the first particular future time, and an availability of funds to pay for the likely financial cost.

* * * * *